(12) United States Patent
Sander et al.

(10) Patent No.: US 12,025,196 B2
(45) Date of Patent: Jul. 2, 2024

(54) BRAKE DEVICE

(71) Applicant: PHYSIK INSTRUMENTE (PI) GMBH & CO. KG, Karlsruhe (DE)

(72) Inventors: Christian Sander, Karlsruhe (DE); Philipp Mahl, Kirchstrabe (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 675 days.

(21) Appl. No.: 17/251,727

(22) PCT Filed: Jun. 13, 2019

(86) PCT No.: PCT/DE2019/100542
§ 371 (c)(1),
(2) Date: Dec. 11, 2020

(87) PCT Pub. No.: WO2019/238173
PCT Pub. Date: Dec. 19, 2019

(65) Prior Publication Data
US 2021/0215214 A1 Jul. 15, 2021

(30) Foreign Application Priority Data

Jun. 14, 2018 (DE) .......................... 102018114309.5

(51) Int. Cl.
*H02N 2/04* (2006.01)
*F16D 65/16* (2006.01)
(Continued)

(52) U.S. Cl.
CPC .............. *F16D 65/16* (2013.01); *H02N 2/043* (2013.01); *F16D 2121/30* (2013.01); *F16D 2125/64* (2013.01)

(58) Field of Classification Search
CPC .. F16D 2121/28; F16D 55/2245; F16D 65/18; F16D 65/16; F16D 2121/30; F16D 2125/64; H02K 7/107; H02N 2/043
See application file for complete search history.

(56) References Cited

U.S. PATENT DOCUMENTS 4,570,095 A * 2/1986 Uchikawa .............. H02N 2/043
310/328
4,703,215 A * 10/1987 Asano .................... H02N 2/043
310/328
(Continued)

FOREIGN PATENT DOCUMENTS

EP 3078557 A1 * 10/2016 ............ B60T 11/046
WO WO-2009095950 A1 * 8/2009 ............. F16D 49/08

*Primary Examiner* — Nicholas J Lane
*Assistant Examiner* — Stephen M Bowes
(74) *Attorney, Agent, or Firm* — GREENBERG TRAURIG, LLP

(57) ABSTRACT

The invention relates to a brake device having a frame, at least one pair of mutually opposing braking elements, at least one actuation element in operative connection with each braking element, and a spring device, wherein each braking element has three joint sections which are arranged in a row and are connected to one another via flexure bearings, and the middle joint section of which has a contact section, and the two joint sections adjoining the middle joint section are each connected integrally to the frame via a flexure bearing, wherein a force is exerted on each braking element by means of the spring device, by means of which force the respective contact section can be pressed with a defined force against an element to be braked, and a force which counteracts the force exerted on the braking elements by the spring device acts on the braking elements by means of a continuous energy input into the actuation elements and, (Continued)

when the energy input into the actuation elements is absent, the force exerted by the latter on the braking elements is removed.

8 Claims, 9 Drawing Sheets

(51) Int. Cl.
*F16D 121/30* (2012.01)
*F16D 125/64* (2012.01)

(56) References Cited

U.S. PATENT DOCUMENTS

| | | | | |
|---|---|---|---|---|
| 4,933,591 | A | * | 6/1990 | Stahlhuth .............. H02N 2/043 310/328 |
| 4,937,489 | A | * | 6/1990 | Hattori .................. H02N 2/043 310/328 |
| 4,952,835 | A | * | 8/1990 | Stahlhuth .............. H02N 2/043 310/328 |
| 2003/0137218 | A1 | * | 7/2003 | Hermle ................ B64C 27/615 310/328 |
| 2009/0058227 | A1 | * | 3/2009 | Takahashi .............. H02N 2/028 310/323.16 |

* cited by examiner

BRAKE DEVICE

FIELD OF THE INVENTION

The invention relates to a brake device according to claims 1 to 8.

BACKGROUND

From U.S. Pat. No. 8,534,429 B2 a braking system for a multiphase motor is known in which a disc is placed on the output shaft of the multiphase motor, with which a clamping device driven by a piezo actuator and having a lever transmission can be brought into contact, wherein through said contact between the clamping device and the disc a braking or holding of the position of the multiphase motor can be achieved due to the resulting friction. The resulting advantage is that the multiphase motor does not have to be supplied with electrical energy to hold the desired position and a significant energy saving is achieved.

However, the external braking system located outside the servomotor also requires energy to maintain the clamping contact or clamping force. In other words, it is necessary for an electrical voltage to be applied to the piezo actuator as long as the position of the multiphase motor is to be held by the braking system. This also results in a loss of energy, but this is much less than supplying the multiphase motor with electrical energy to hold a desired position. In addition, the braking system becomes ineffective in the event of an interruption in the supply of electrical energy, for example in the event of a power failure.

A braking device for braking a rail-guided transport device and in particular a lift is known from DE 10 2012 107 362 A1, in which two brake levers having a brake pad and pivotally mounted via solid joints can be pressed against a rail arranged between them. In one operating mode, an actuator in the form of an electric motor ensures that the brake levers or the brake pads are lifted off the rail and an air gap results. In this operating mode, the electric motor is operated with a certain power, with which the electric motor permanently works against the force of a spring arrangement, which pulls the brake levers towards one another such that the brake device is held open and a smooth movement of the rail is made possible. If a braking process is initiated in another operating mode, the motor power is continuously reduced such that the force of the spring arrangement becomes more dominant and this ensures that the opposite brake levers move towards one another and finally the brake pads come into friction contact with the rail. The continuous reduction of the motor power results in a gentle application of the brake pads to the rail. Emergency braking in the event of power failure or defect of the electric motor is also possible with such a brake device. However, in this case the braking effect occurs abruptly, as the spring force acts immediately after sudden loss of motor power and presses the brake levers towards one another at high speed.

A disadvantage of the brake device known from DE 10 2012 107 362 A1 is the comparatively large installation space it takes up. In order to achieve the desired high braking force, it is necessary, on the one hand, to design very long brake levers and, on the other hand, to design the brake pads to be large so that there is a large contact surface between them and the rail to be braked. This also has disadvantages, in that the actuator and the spring arrangement are arranged comparatively close to the point of rotation of the brake lever, such that, to achieve higher forces, a more powerful electric motor and a spring arrangement generating high forces are required. A further disadvantage is the asymmetrical action of the forces generated by the electric motor and the spring arrangement, such that under certain circumstances asymmetrical force introduction into the brake levers and thus asymmetrical friction forces between the brake pads and the rail can occur, which can lead to uneven wear of the brake pads, and also to reduced braking power.

SUMMARY OF THE INVENTION

Therefore, the object of the invention is to provide a brake device with which a high and evenly or symmetrically distributed braking force can be achieved despite compact dimensions.

This object is achieved by a brake device according to claim 1, wherein the subsequent dependent claims 2 to 8 at least describe expedient further developments.

The term 'substantially', which is occasionally used in the following part of the description in connection with the specification of geometric data such as angles, dimensions, positions, orientations or directions is to be understood as meaning that the corresponding geometric data may have a deviation of +/−5% from the geometric data specified in each case, wherein this deviation is due to manufacturing or assembly tolerances, for example.

The brake device according to the invention comprises a frame, at least one pair of mutually opposing braking elements, at least one actuation element in working connection with the respective braking element, and a spring device. Each braking element has three joint sections in a row and connected to one another by flexure bearings, of which the middle joint section has a contact section and the two joint sections adjoining the middle joint section are each connected to the frame in one piece by a flexure bearing. By means of the spring device a force is exerted on the respective braking element by which the respective contact section can be pressed with a defined force against an element to be braked located between the braking elements.

The brake device is designed such that a force which counteracts the force exerted on the braking elements by the spring device can be generated on the braking elements by means of a continuous energy input into the actuation elements, and the force is preferably greater than the force exerted on the braking element by the spring device, such that this can be completely removed or compensated for.

When the energy input into the actuation elements is absent, the force exerted on the braking elements by the actuation elements is lifted, such that only the force exerted on the braking elements by the spring device is effective. This presses the braking elements or their contact section with a high force evenly from two opposite sides against an element to be braked, and the contact or engagement of the braking elements with the element to be braked ensures that unintentional movement of the element to be braked is prevented or any movement of the element to be braked is stopped.

Due to the specific design of the braking elements, even low spring forces result in high contact forces of the contact sections against the element to be braked, and the provision of actuators separately and identically assigned to each braking element results in a symmetrical application of force, such that overall high and evenly or symmetrically distributed braking forces are achievable.

It can be advantageous for each of the actuation elements to be designed as a piezoelectric actuator in which a change in length, and preferably an increase in length, can be brought about by an electrical energy input. Piezoelectric actuators in particular have the advantage that they are HV (high vacuum) or even UHV (ultra-high vacuum) compatible and have no magnetic properties. In addition, piezoelectric actuators are characterised in that they have only a low power consumption when holding a position and the corresponding production of heat is also low. Of course, it is also possible to use other electrically controlled actuation elements, such as electric motors, to exert a corresponding force on the braking elements. Electromagnetically, pneumatically or hydraulically operated actuation elements are also conceivable.

Furthermore, it can be advantageous for the brake device to have a lever transmission device. This makes it possible to achieve a transmission ratio of, if appropriate, only a small travel of the actuation element, which is in particular to be obtained when using a piezoelectric actuation element.

It can also be advantageous for the brake device to comprise at least one, disc spring, a tension spring or at least one tension spring section. Thus, it can be advantageous for the direction of the force of the disc spring or the tension spring or tension spring section to be substantially perpendicular to a braking element or substantially parallel to a braking element. Due to the respective direction of action of the force of the disc spring or the tension spring or tension spring section, a particularly favourable force flow can be achieved, which increases the functional safety of the braking device. When using a set with a plurality of disc springs, a very high spring force can be achieved with small dimensions.

It can be a further advantage for both of the braking elements to have an elongated shape, wherein the actuation elements are substantially parallel to the longitudinal extension of the braking elements.

In addition, it can be advantageous for the spring device to have a plurality of tension springs which are each arranged substantially parallel to an actuation element.

It may prove advantageous that the spring device comprises two spring elements connected to the brake elements, and each of the spring elements has two tension spring sections arranged parallel to one another, wherein the tension spring sections are arranged substantially perpendicular to the brake elements.

The invention also relates to a drive unit with an element to be braked in the form of a drive element and a brake device according to any of the preceding claims for cooperating with the drive element. The invention also relates to a positioning device having at least one such drive unit.

BRIEF DESCRIPTION OF THE DRAWINGS

Advantages and expediencies of the invention are described in more detail in the following description of preferred exemplary embodiments using the figures. In the figures.

DETAILED DESCRIPTION

Figure 1:
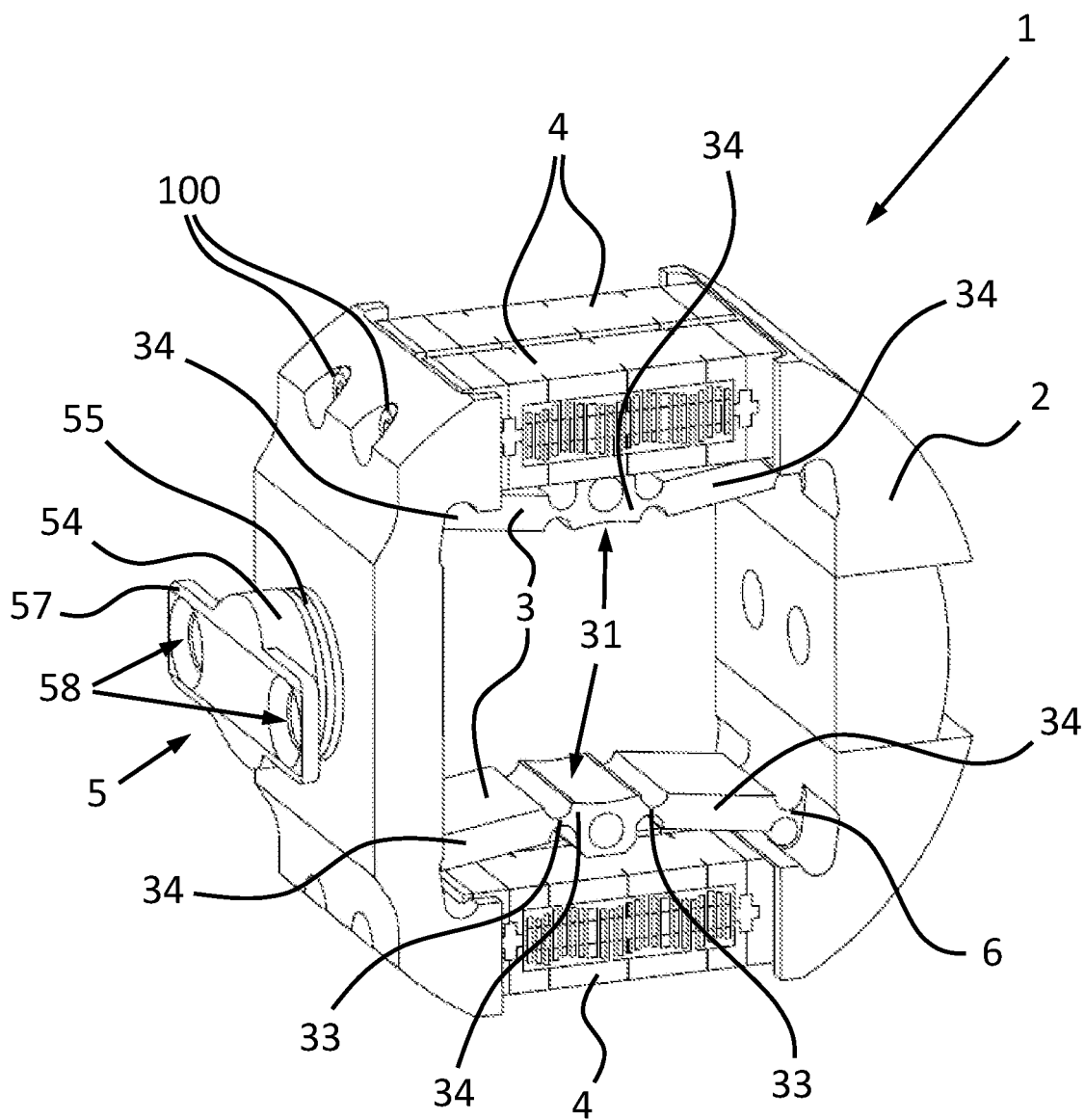
FIG. 1: shows a perspective view of an embodiment of the brake device according to the invention

FIG. 1 shows a perspective view of a first embodiment of the brake device (1) according to the invention. This brake device has two braking elements (3) arranged mutually opposing one another, wherein both of the braking elements (3) are connected in one piece to the frame (2) via two flexure bearings (6) arranged at different ends.

Each braking element (3) has an elongated shape and comprises three joint sections (34) arranged in a row or one behind the other, wherein adjacent joint sections (34) are each connected to one another via a flexure bearing (33). The respective middle joint section has a contact section (31) provided for contact with an element to be braked. The contact section (31) of both braking elements (3) point in directions towards one another.

A total of four actuation elements (4) in the form of piezoelectric actuators are inserted into the frame (2). Two of the actuation elements (4) are arranged directly next to one another and parallel to one another and act on the respective end section of the frame (2). Due to a change in length of the actuator elements (4) brought about by continuous energy input, a displacement of one element of the frame relative to the other element of the frame (2) (in FIG. 1 the right part of the frame 2), which is intended for attachment to a higher-level unit, occurs. Due to the connection on both sides of the braking element (3) to the frame (2) or the elements of the frame via flexure bearings (6), a desired movement of the braking element (3) occurs, in which the joint section (34) with the contact section (31) moves towards the adjacent and associated actuation elements 4. The mutually opposed braking element (3) makes an analogous movement, such that with continuous energy input into the actuation elements (4) and the accompanying change in length of the actuation elements (4), the joint sections (34) with the contact section (31) move away from one another in opposite directions.

Each actuation element (4) is in contact with a screw (100) associated thereto, which is inserted into a corresponding tapped hole in the frame (2), wherein, by means of the respective screw (100), the actuating element (4) in contact therewith can be subjected to a compressive force or pre-tensioning.

The spring device (5) is located on the left-hand element of the frame (2) in FIG. 1, which comprises a tensioning element (54) and a set of disc springs (55). The tensioning element (54) also has a journal (56) (not visible in FIG. 1) and a collar section (57) having two through holes (58). The journal (56) protrudes into a correspondingly shaped recess in the frame (2), while the disc springs (55) arranged around the journal (56) are supported, on the one hand, on the frame (2) and, on the other, on a shoulder section of the tensioning element (54). By means of screws (not shown in FIG. 1), which protrude through the through holes (58) of the collar section (57) of the tensioning element (54), the tensioning element (54) is connected to a sleeve (103) (also not shown in FIG. 1), and this connection simultaneously compresses the disc springs (55), resulting in a force with which the two elements of the frame (2) can be moved towards one another in one direction. Thus, the force exerted by the spring device (5) on the elements of the frame (2) counteracts the force on the elements of the frame (2) caused by the actuation elements due to a change in length. The direction of the force of the spring device (5) is thus substantially parallel to the orientation of the elongated braking element (3).

Figure 2:
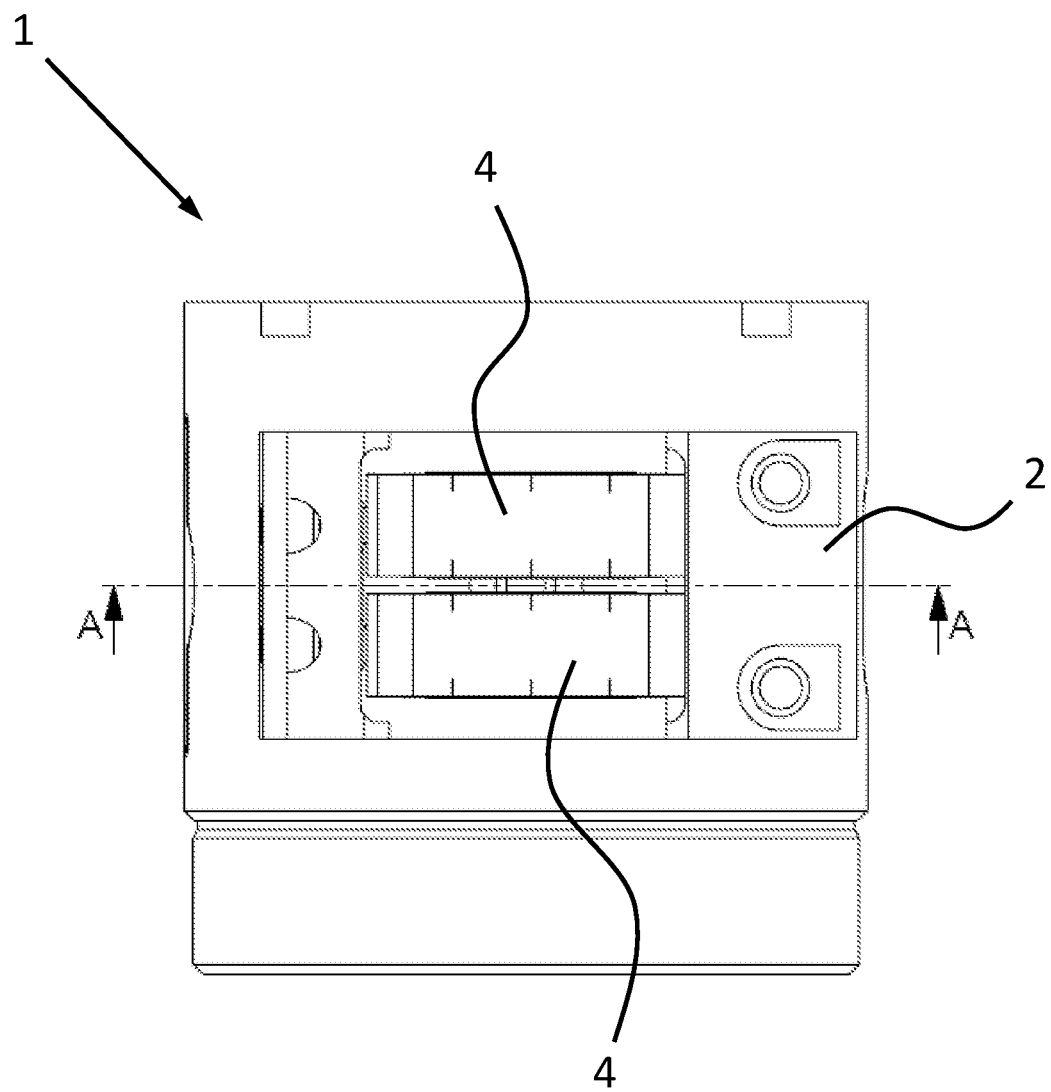
FIG. 2: shows a plan view of the brake device according to FIG. 1

FIG. 2 shows a plan view of the brake device according to FIG. 1. FIG. 2 also indicates a cut along the cut line A-A, wherein the corresponding sectional view is shown in FIG. 3.

Figure 3:
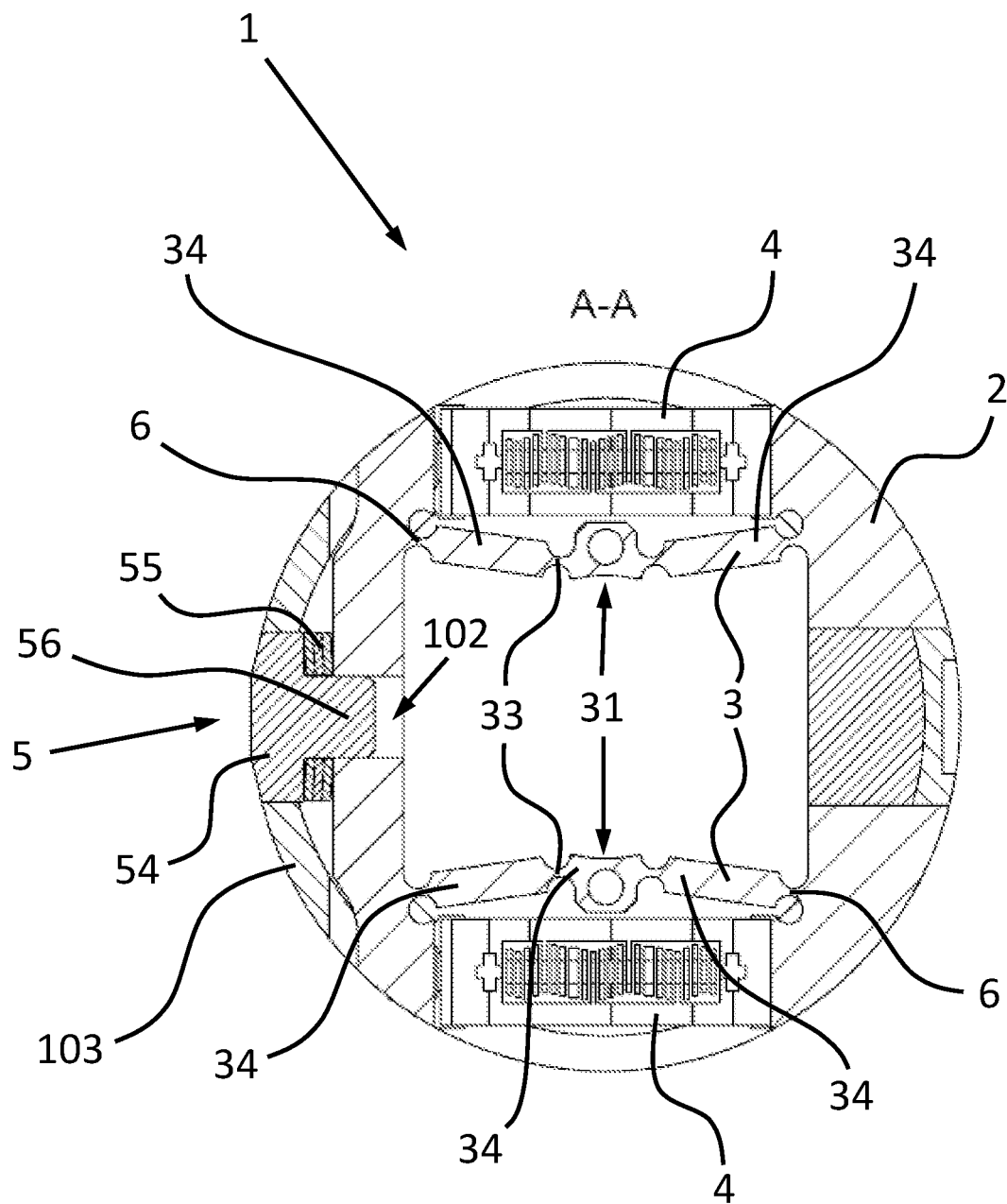
FIG. 3: shows a sectional view of the brake device according to FIG. 1 along the cut according to FIG. 2

FIG. 3 shows the spring device (5) with the tensioning element (54), the journal (56) of which cooperates with a corresponding recess (102) in the frame (2) or in the left-hand element of the frame (2) in FIG. 3, wherein the set of a plurality of disc springs (55) is arranged, around the journal (56) of the tensioning element (54), which disc spring set is supported against the shoulder section of the tensioning element (54). Via the collar section (57) of the tensioning element (54), which has two through holes (58), the tensioning element (54) is connected to the sleeve (103) of the brake device (1) by means of screws (not shown in FIG. 3), which project through the through holes of the collar section (57), wherein the disc springs (55) are compressed by this connection in order to thereby press the element of the frame (2) which is on the left in FIG. 3 towards the element of the frame (2) which is on the right in FIG. 3.

Figure 4:
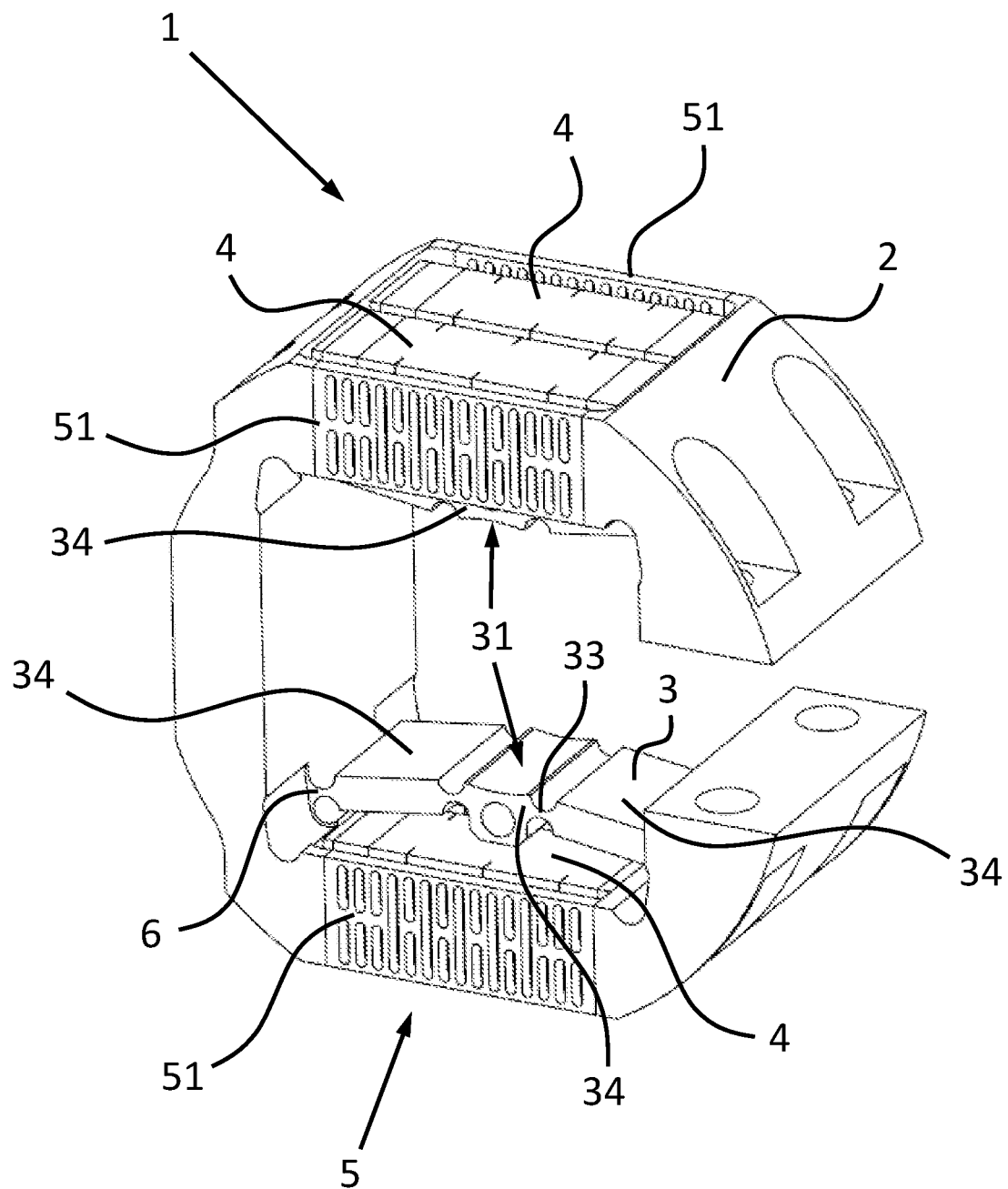
FIG. 4: shows a perspective view of a further embodiment of the brake device according to the invention

FIG. 4 shows a further embodiment of a brake device 1 according to the invention, which is similar to the embodiment according to FIGS. 1 to 3. It differs substantially therefrom in that the spring device (5) is constructed differently and is also arranged in a different place. The spring device (5) comprises in total four tension springs (51) in the form of flat spring steel sheets, which are each arranged next to an actuation element (4) and aligned parallel thereto. The direction of the force of the spring device (5) or the tension springs (51) is thus substantially parallel to the orientation of the elongated braking element (3).

Figure 5:
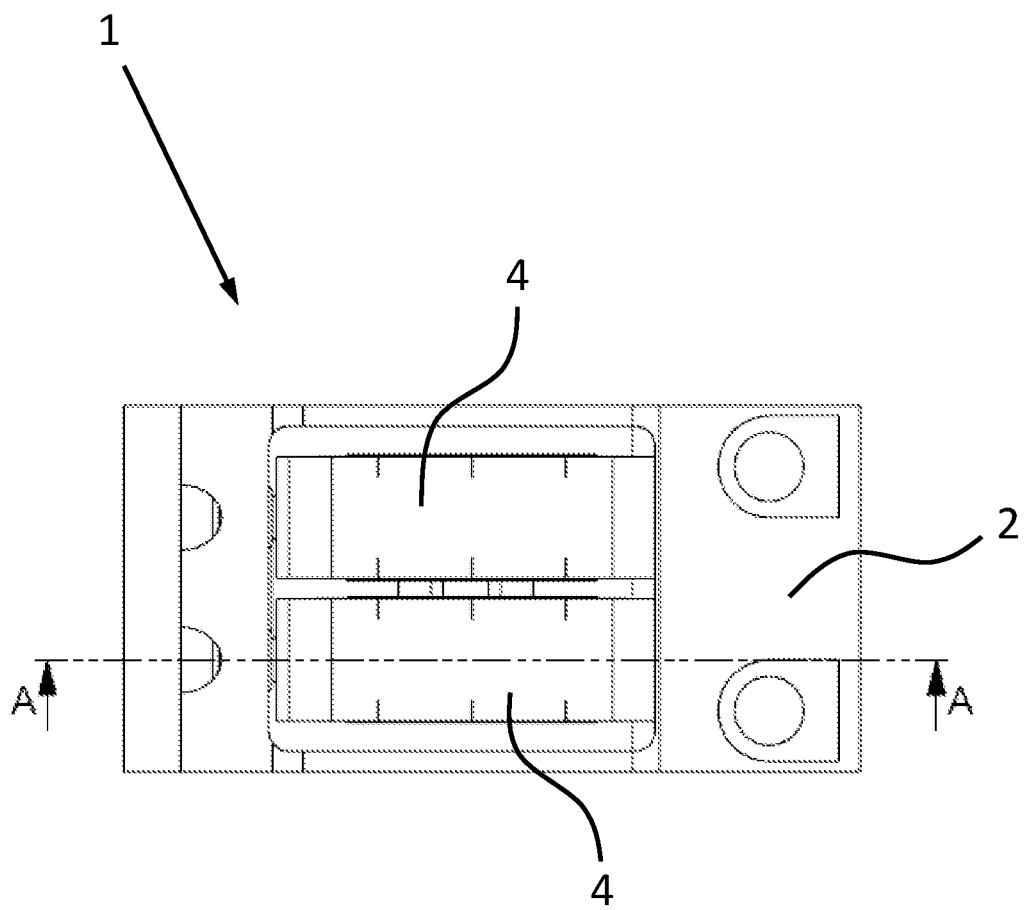
FIG. 5: shows a plan view of the brake device according to FIG. 4
Figure 6:
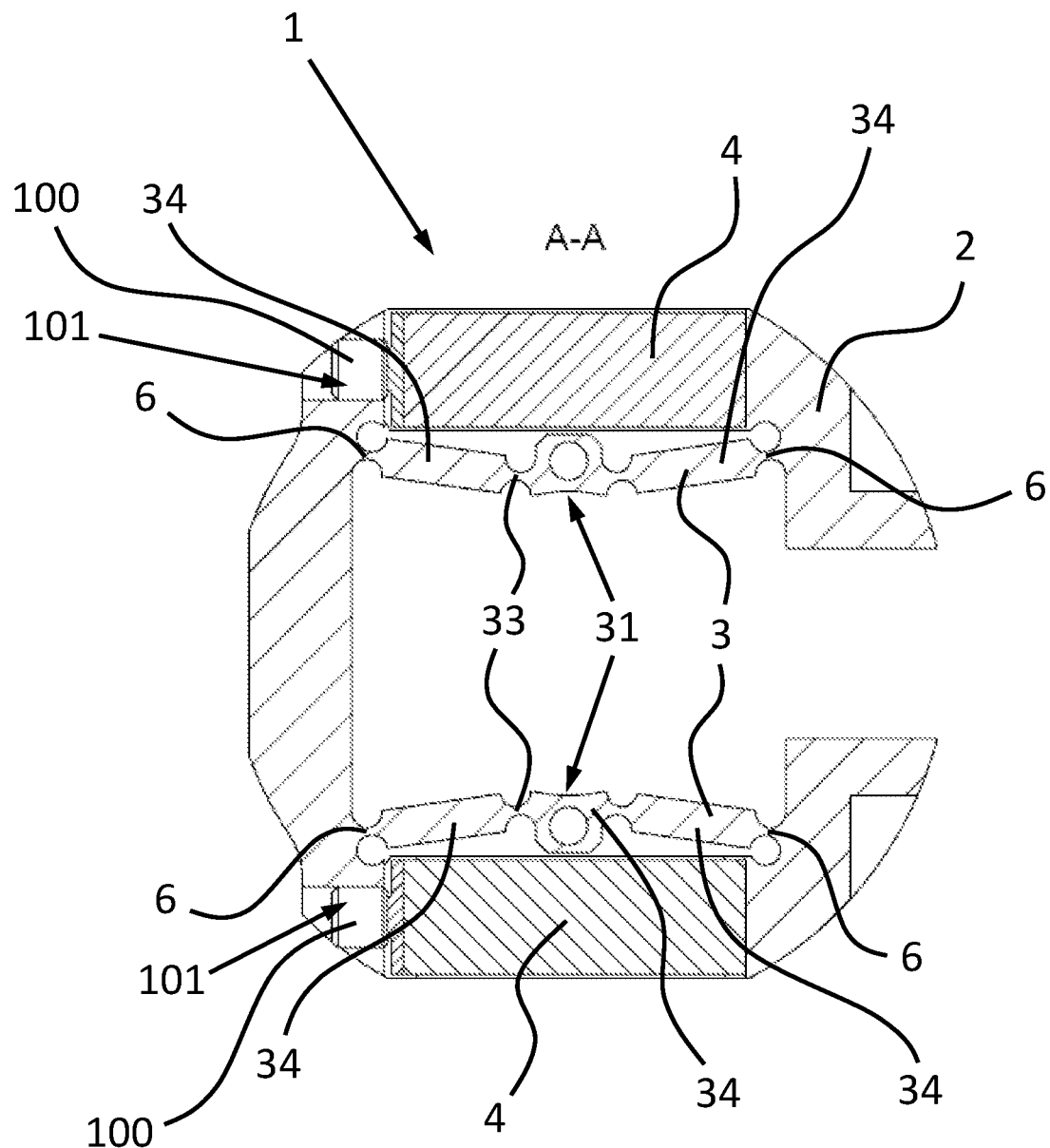
FIG. 6: shows a sectional view of the brake device according to FIG. 4 along the cut according to FIG. 5

FIG. 5 shows the brake device (1) according to FIG. 4 in a plan view, while FIG. 6 corresponds to a sectional view along the cut A-A indicated in FIG. 5.

Figure 7:
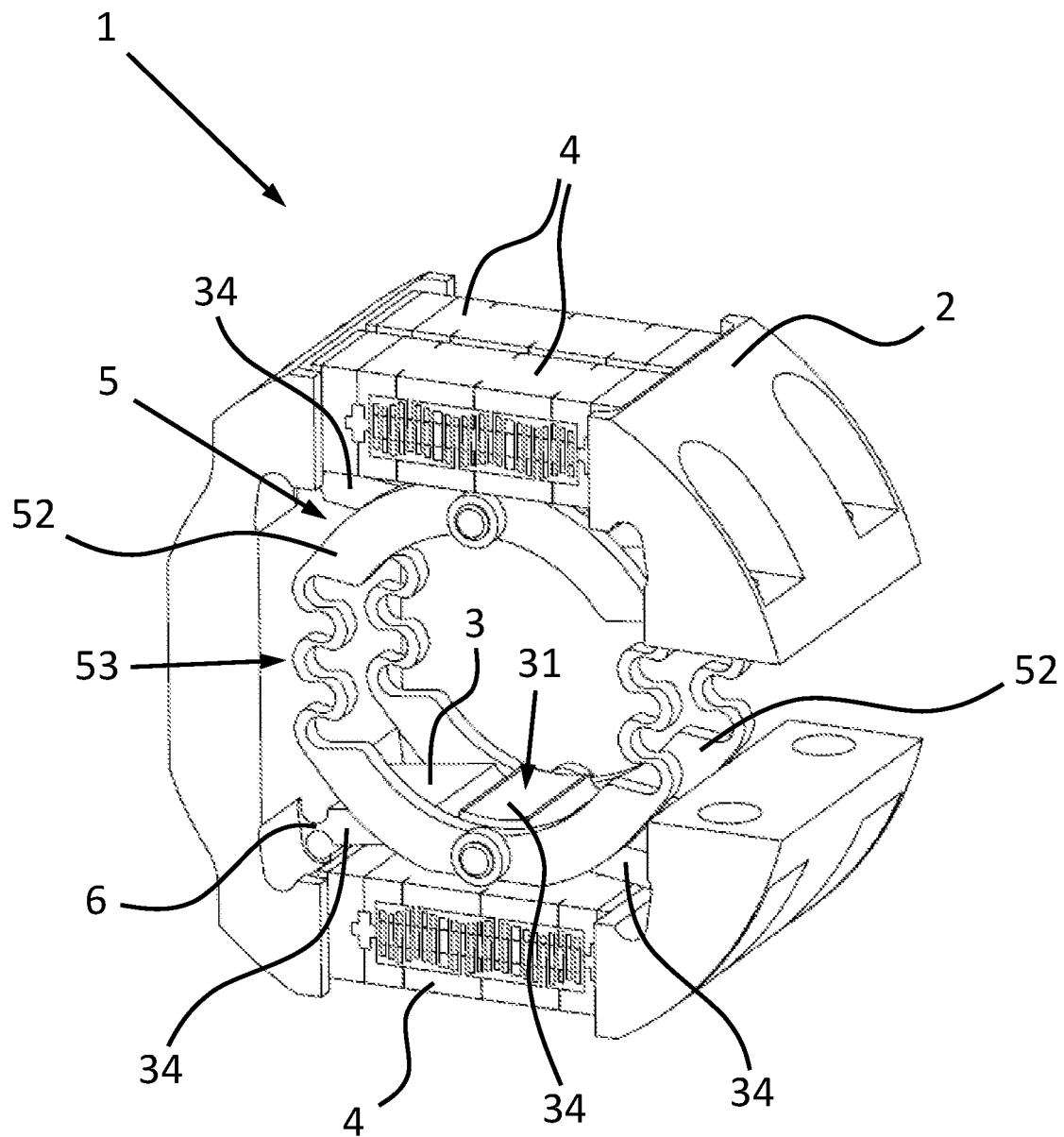
FIG. 7: shows a perspective view of a further embodiment of the brake device according to the invention

With the brake device (1) according to FIG. 7, which is also similar to the brake device according to FIGS. 1 to 3 or to the brake device according to FIGS. 4 to 6, the spring device (5) is formed by two substantially annular spring elements (52), each of which has two tension spring sections (53). Each of the spring elements (52) is connected to the joint sections (34) of both braking elements (3), the joints having the contact section (31). The direction of the force of the spring device (5) is thus substantially perpendicular to the orientation of the elongated braking element (3).

Figure 8:
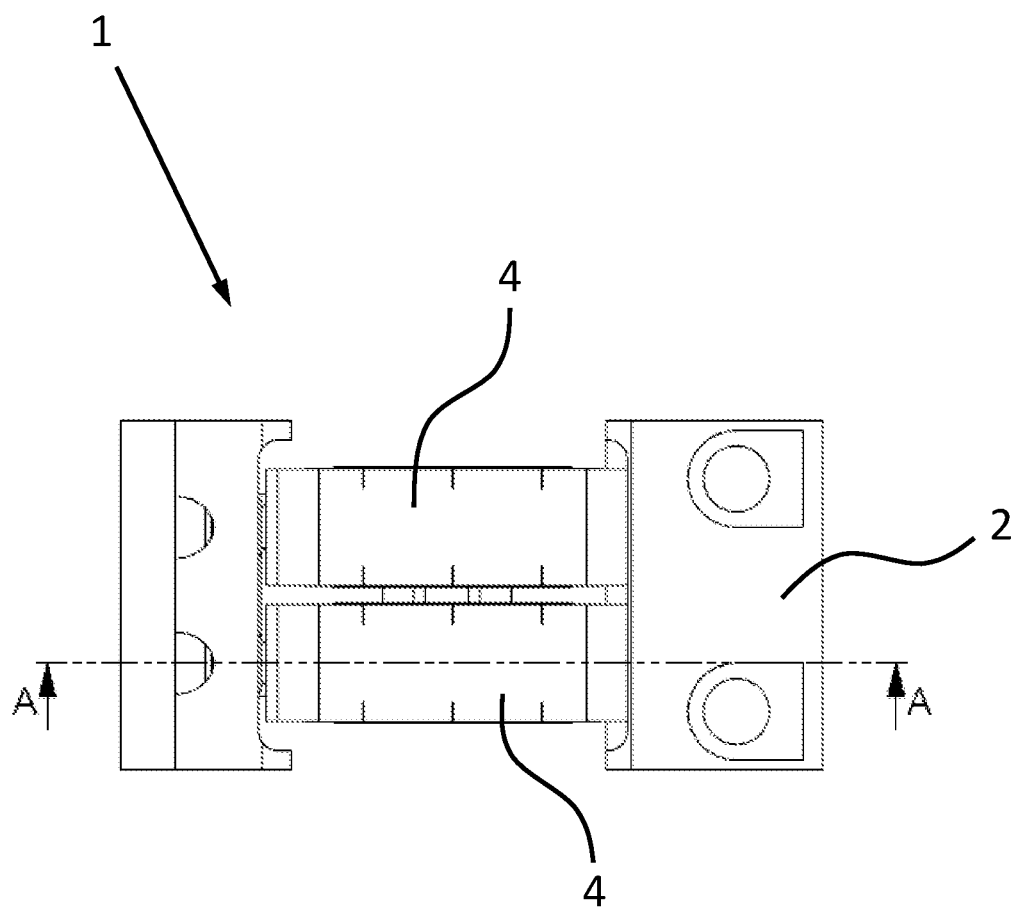
FIG. 8: shows a plan view of the brake device according to FIG. 7
Figure 9:
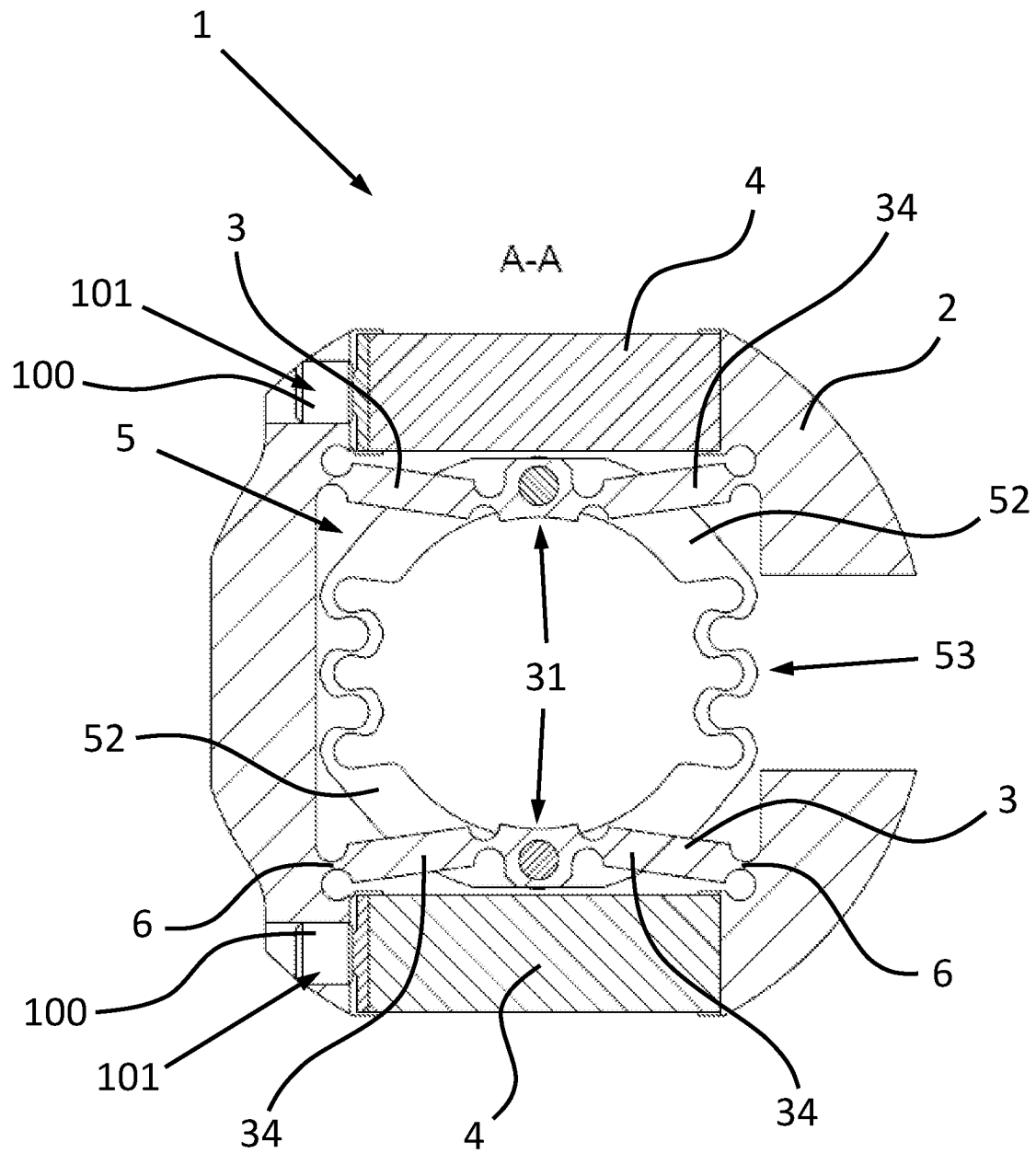
FIG. 9: shows a sectional view of the brake device according to FIG. 7 along the cut according to FIG. 8

FIG. 8 shows the brake device according to FIG. 7 in a plan view and also indicates a cut along the cut line A-A, wherein the corresponding sectional view is shown in FIG. 9.

LIST OF REFERENCE NUMERALS

1 Brake device
2 Frame
3 Braking element
31 Contact section (of the braking element 3)
33 Flexure bearing (of the braking element 3)
34 Joint sections (of the braking element 3)
4 Actuation element
5 Spring device
51 Tension spring (of the spring device 5)
52 Spring element (of the spring device 5)
53 Tension spring section (of the spring element 52)
54 Tensioning element (of the spring device 5)
55 Disc spring (of the spring device 5)
56 Journal (of the tensioning element 54)
57 Collar section (of the tensioning element 54)
58 Through holes (of the collar section 57)
6 Flexure bearing
100 Screw
101 Tapped bore
102 Recess (of the frame 2)
103 Sleeve (of the brake device 1)

The invention claimed is:

1. A brake device comprising:
a frame;
at least one pair of mutually opposing braking elements;
at least one actuation element in operative connection with each braking element; and
a spring device;
   wherein each braking element has
      three joint sections which are arranged in a row and are connected to one another via flexure bearings, and
      a middle joint section of the three joint sections which has a contact section,
   wherein the three joint sections form a concavity facing away from the contact section;
      wherein two joint sections of the three joint sections adjoining the middle joint section are end joint sections each connected integrally to the frame via a respective flexure bearing of the flexure bearings;
   wherein the spring device is positioned to exert a first force on each braking element so that the respective contact section can be pressed with a defined force against an element to be braked situated between the braking elements;
   wherein the brake device is designed such that a continuous energy input into the actuation elements can generate a second force on the braking elements which counteracts the first force exerted on the braking elements by the spring device; and
   wherein, when the continuous energy input into the actuation elements is absent, the second force exerted by the actuation elements on the braking elements is removed.

2. The brake device according to claim 1, wherein each actuation element is a piezoelectric actuator in which a change in length can be brought about by an electrical energy input.

3. The brake device according to claim 1, wherein the spring device comprises at least one disc spring, a tension spring, or at least one tension spring section.

4. The brake device according to claim 3, wherein a direction of the first force of the disc spring, the tension spring, or the tension spring section is substantially perpendicular to a braking element of the at least one pair of mutually opposing braking elements or substantially parallel to the braking element.

5. The brake device according to claim 1, wherein both of the braking elements have an elongated shape; and
   wherein the actuation elements are arranged substantially parallel to a longitudinal extension of a braking element of the at least one pair of mutually opposing braking elements.

6. The brake device according to claim 1, wherein the spring device has a plurality of tension springs which are each arranged substantially parallel to the actuation element.

7. A drive unit, comprising:
a brake device comprising:
- a frame;
- at least one pair of mutually opposing braking elements;
- at least one actuation element in operative connection with each braking element; and
- a spring device;
    - wherein each braking element has
        - three joint sections which are arranged in a row and are connected to one another via flexure bearings, and
        - a middle joint section of the three joint sections which has a contact section,
            - wherein the three joint sections form a concavity facing away from the contact section;
            - wherein two joint sections of the three joint sections adjoining the middle joint section are end joint sections each connected integrally to the frame via a respective flexure bearing of the flexure bearings;
    - wherein the spring device is positioned to exert a first force on each braking element so that the respective contact section can be pressed with a defined force against an element to be braked situated between the braking elements;
    - wherein the brake device is designed such that a continuous energy input into the actuation elements can generate a second force on the braking elements which counteracts the first force exerted on the braking elements by the spring device; and
    - wherein, when the continuous energy input into the actuation elements is absent, the second force exerted by the actuation elements on the braking elements is removed.

8. A positioning device, comprising:
a brake device comprising:
- a frame;
- at least one pair of mutually opposing braking elements;
- at least one actuation element in operative connection with each braking element; and
- a spring device;
    - wherein each braking element has
        - three joint sections which are arranged in a row and are connected to one another via flexure bearings, and
        - a middle joint section of the three joint sections which has a contact section,
            - wherein the three joint sections form a concavity facing away from the contact section;
            - wherein two joint sections of the three joint sections adjoining the middle joint section are end joint sections each connected integrally to the frame via a respective flexure bearing of the flexure bearings;
    - wherein the spring device is positioned to exert a first force on each braking element so that the respective contact section can be pressed with a defined force against an element to be braked situated between the braking elements;
    - wherein the brake device is designed such that a continuous energy input into the actuation elements can generate a second force on the braking elements which counteracts the first force exerted on the braking elements by the spring device; and
    - wherein, when the continuous energy input into the actuation elements is absent, the second force exerted by the actuation elements on the braking elements is removed.

* * * * *